PIPETTING SYSTEM
Original Filed Aug. 16, 1968 2 Sheets-Sheet 1
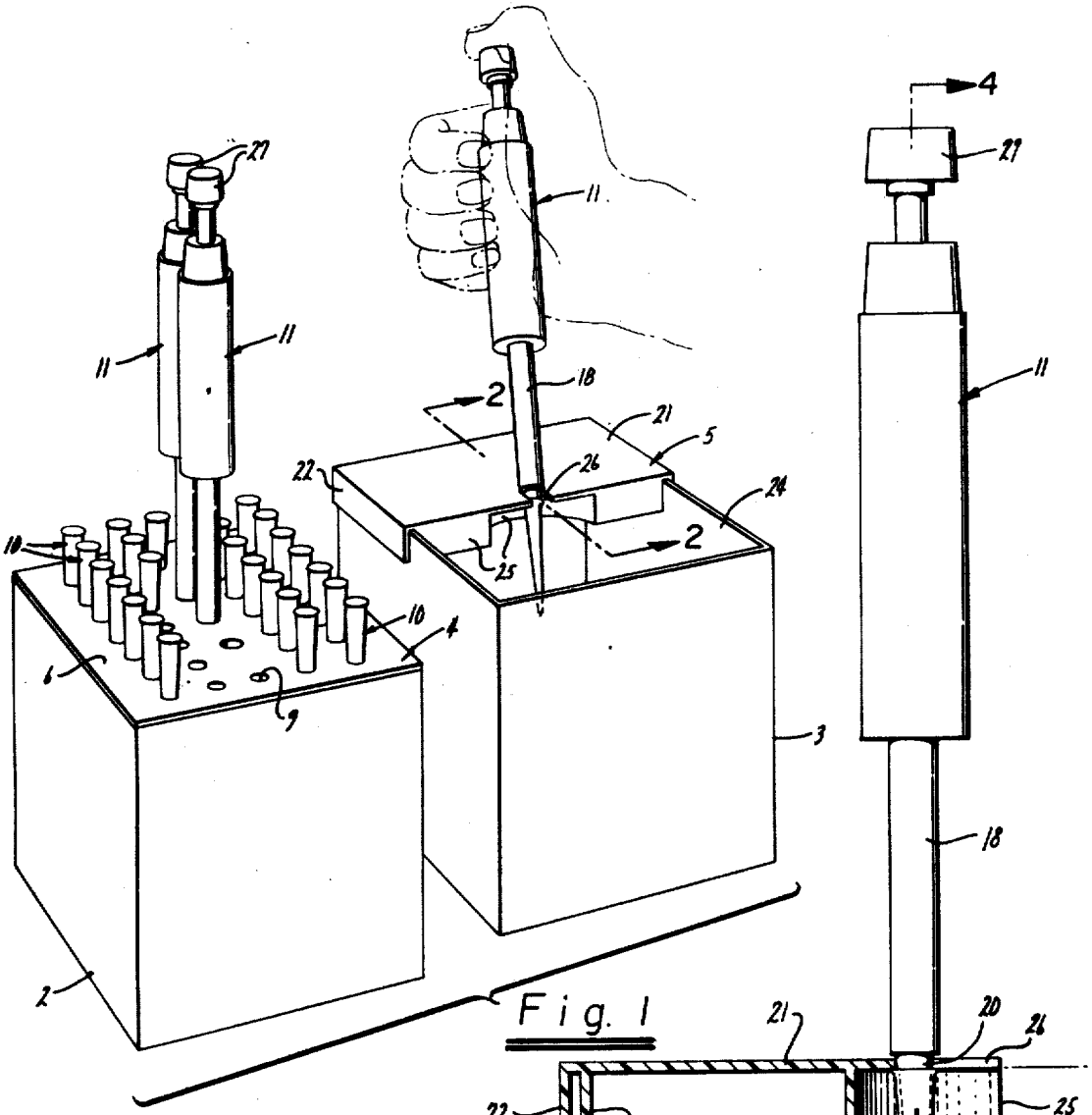
Fig. 1
Fig. 2
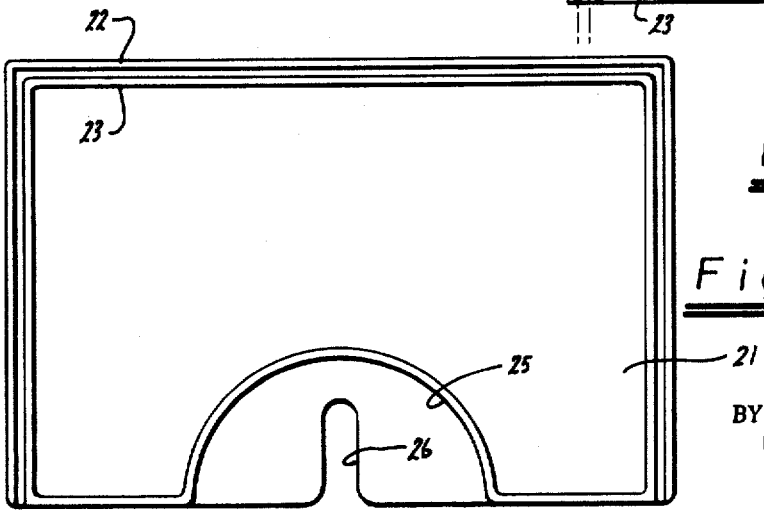
Fig. 3
INVENTOR.
William J. Roach
BY Paul B. Hunter
Attorney PIPETTING SYSTEM
Original Filed Aug. 16, 1968 2 Sheets-Sheet 2
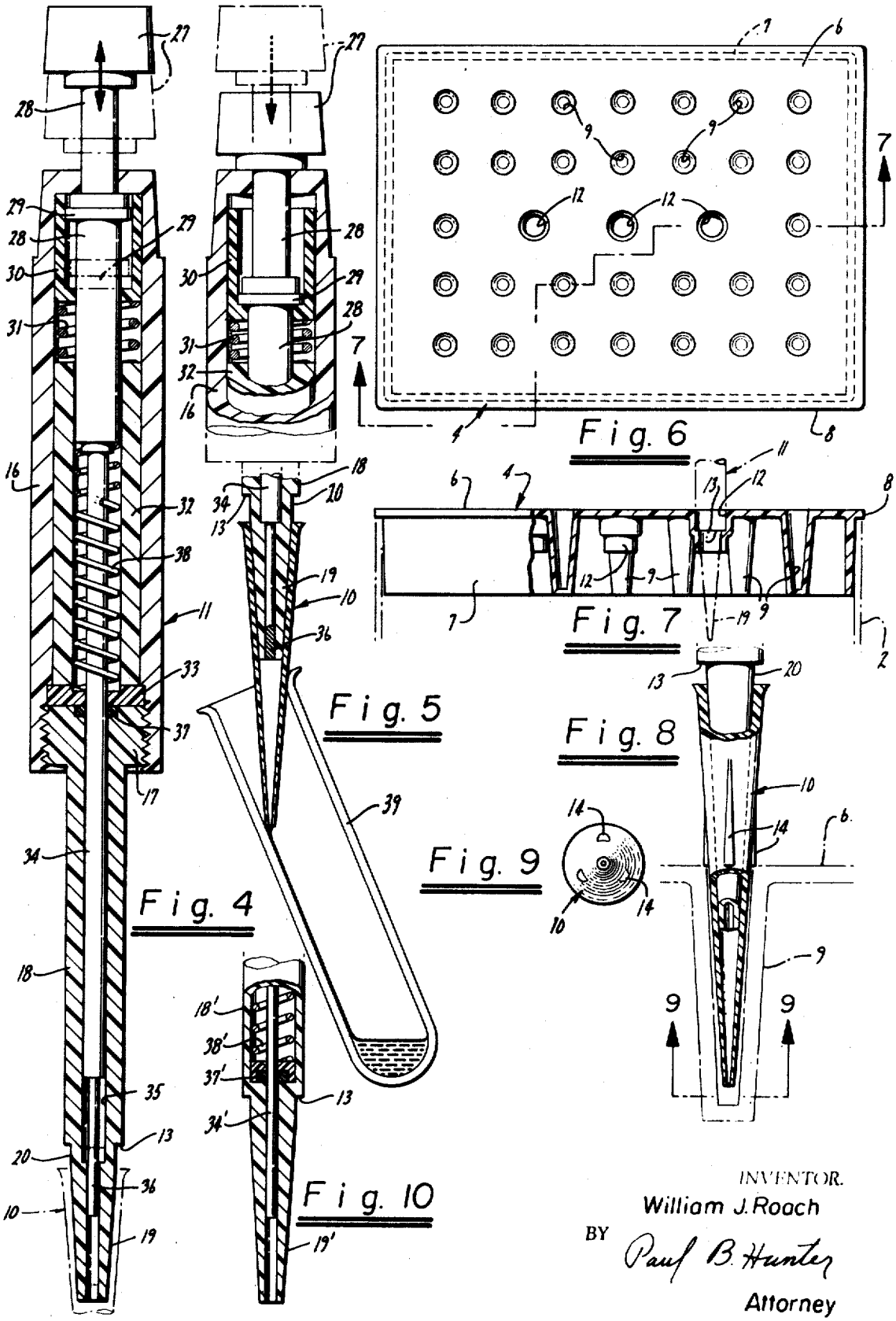
INVENTOR.
William J. Roach
BY Paul B. Hunter
Attorney United States Patent Office Re. 27,637
Reissued May 8, 1973

27,637
PIPETTING SYSTEM

William J. Roach, 187 Shooting Star Isle,
Foster City, Calif. 94404

Original No. 3,494,201, dated Feb. 10, 1970, Ser. No. 753,268, Aug. 16, 1968. Application for reissue Sept. 7, 1971, Ser. No. 178,515
Int. Cl. B01l *3/02*
U.S. Cl. 73—425.6 18 Claims

Matter enclosed in heavy brackets [ ] appears in the original patent but forms no part of this reissue specification; matter printed in italics indicates the additions made by reissue.

ABSTRACT OF THE DISCLOSURE

A hollow cylindrical body has an apertured lower end portion for frictionally attaching removable tips. A movable piston, within the body, extends into the lower end portion. A collar is fixed to the upper portion of the piston and moves within a calibrating cup. The calibrating cup also moves within the body. Depressing a knob attached to the upper end of the piston will overcome the tension in a primary spring, which is interposed between a portion of the piston an dthe body, until the calibrating collar strikes the bottom of the calibrating cup constituting the calibration movement of the piston. An over-shoot of travel by the piston may be accomplished by further depressing the knob against the action of a relatively stiff secondary spring interposed between the bottom of the cup and the body.

This invention relates generally to pipetting systems, and the invention has reference more particularly to a novel micropipetting system that is adapted to dispense liquids such as plasma or reagents with an exceedingly high degree of accuracy and reproducibility.

Pipetters as heretofore used for dispensing liquids have been generally objectionable for various reasons such as lack of accuracy in reproducibly dispensing desired definite quantities of liquids, lack of cleanliness due to manual handling of the dispensing tips used or other causes such as cross-contamination, or because the pipetters used have been complicated in structure and expensive to purchase and difficult to use.

The principal object of the present invention is to provide a novel pipetting system that is suitable for accurately dispensing liquids in the range of five to one thousand lambdas (microliters) and which is so constructed and arranged as to eliminate cross-contamination or otther contamination of the samples dispensed.

A feature of the present invention is to provide a novel pipetting system of the above character employing a precision micro pipetter in conjunction with a combined instrument rack and tip loading tray together with a tip extractor, the system being so constructed and arranged that there is no manual touching of the tips used.

Another feature of the present invention is to provide a novel pipetting system of the above character employing precision molded, non-wettable, disposable plastic tips.

Other features and advantages of the present invention will become more apparent after a perusal of the following specification taken in connection with the accompanying drawings wherein:

FIG. 1 is a perspective view of the novel pipetting system of this invention, showing the manner of using the instrument rack and tip loading tray together with the tip extractor;

FIG. 2 is an enlarged fragmentary view taken along the line 2—2 of FIG. 1;

FIG. 3 is an enlarged view looking at the underside of the tip extractor;

FIG. 4 is an enlarged part sectional view taken along the line 4—4 of FIG. 2;

FIG. 5 is a fragmentary view showing the pipetter in use;

FIG. 6 is a plan view of the instrument rack and tip loading tray;

FIG. 7 is a sectional view taken along the line 7—7 of FIG. 6;

FIG. 8 is an enlarged fragmentary view showing the manner of removing a tip from its loading tray;

FIG. 9 is a view taken along the line 9—9 of FIG. 8; and

FIG. 10 is a fragmentary view of a slightly modified structure of pipetter.

Similar characters of reference are used in the above figures to designate corresponding parts.

Referring now to FIGS. 1 through 9 of the drawings, FIG. 1 illustrates the novel micropipetting system as a whole, shown comprising two boxes 2 and 3, the box 2 supporting a pipetter or instrument rack and tip loading tray 4 while the box 3 supports a tip extractor 5. The instrument rack and tip loading tray 4, as shown in detail in FIGS. 6 and 7, consists of a preferably plastic base 6 of generally rectangular shape having a depending peripheral flange 7 together with a protruding peripheral lip 8 for enabling the rack and tip loading tray to be inserted into the upper portion of box 2 and retained upon the top edge of this box. This rack and tip loading tray is formed with a plurality of depending tip receiving receptacles 9 that are mutually spaced for receiving and supporting tapered tips 10 which latter are precision molded, chemically resistant and non-wettable as well as disposable after a single use. The tips 10 are shown formed with ribs 14, the lower shoulder ends of which abut the top of base 6 to support the tips thereon. It will be noted that the tips 10 are internally tapered and conformably receive the tapered lower ends of the novel pipetters 11 of this invention. In shipping the pipetting system, the tips 10 are normally contained in plastic bags which are found within the boxes 2 and 3. In use, the number of tips intended to be used during any one day are usually removed from the plastic bags and inserted into the receptacles 9 in the loading tray 4, the plastic bags in the meantime having been preferably stored away in a suitable place such as a cabinet.

The pipetters 11 used in conjunction with the tips 10 are adapted to be mounted in depending open-ended mutually spaced socket members 12 provided in the central portion of the plastic base 6 of the instrument rack and tip loading tray 4, these socket members 12 each being provided with an annular step for supporting the pipetters 11, as especially shown in FIG. 7, the pipetters having an annular shoulder 13 for resting on the socket member steps when not in use.

The pipetters 11 comprise a main hollow cylindrical body 16 that is open at its lower end and into which is threaded the upper enlarged end portion 17 of a depending hollow stem or lower tubular body 18 of reduced diameter, said body 18 having a tapered frusto-conical lower end portion 19 below the shoulder 13 for conformably and snugly fitting onto the tips 10. It will be noted that with the end portion 19 inserted into a tip 10, an annular space 20 is provided between shoulder 13 and the top of the tip 10 so as to enable ready removal of the tip by use of tip extractor 5 as will further appear.

Tip extractor 5 comprises a flat, rectangular top portion 21 provided with a depending peripheral flange 22 extending around three of its sides for abutting the outer upper edge portions of three sides of box 3, the fourth side of top portion 21 being spaced from the fourth side of box 3 when mounted thereon so as to leave an open space 24. Tip extractor 5 also has an inner flange 23 slightly spaced from flange 22 for receiving the upper edges of the box 3 therebetween, said inner flange extending also along the fourth side of top portion 21 adjacent opening 24 and being inwardly curved at 25 surrounding a transverse slot 26 provided in the top portion 21, slot 26 being of sufficient width to accommodate the tapered portion 19 of stem 18 just below shoulder 13 and above tip 10 when a tip is attached to the tapered portion 19. Thus, the space 20 will permit the insertion of tapered end portion 19 when it is desired to remove a tip, such removal being accomplished by tilting pipetter 11 slightly as illustrated in FIG. 1, thus removing the tip 10 without manually touching the same, to prevent contamination.

The pipetter 11 comprises an upper exterior plunger knob 27 that is attached to the upper end of a plunger piston 28 that extends through the upper end of the body 16 and downwardly within the hollow interior thereof and has a calibrating collar 29 fixed thereon that is slidable vertically within a calibrating cup 30 which in turn is slidable within the interior body 16. A secondary relatively stiff coil compression spring 31 abuts at its upper end against the bottom of calibrating cup 30, thus urging the upper edge of this cup into abutting relation to the inner surface of the top of body 16, while the lower end o fthis spring abuts the top of a spring retainer sleeve 32 that extends downwardly within body 16 and abuts an O-ring retainer disc 33 which in turn abuts the top of stem 18.

The plunger piston 28 has a reduced lower portion or piston 34 that extends downwardly within body 16, through disc 33, and within stem 18. The hollow interior of stem 18 is of such diameter as to permit a sliding fit for the piston 34, and, with the knob 27 and calibrating collar 29 in their uppermost positions as shown in FIG. 4, there remains a space 35 within stem 18 to allow downward movement of this piston. Piston 34 is shown provided with a reduced extension 36 which extends downwardly into the tapered portion 19 of stem 18, the central aperture within this tapered portion accommodating extension 36 with a sliding fit. The upper surface of enlarged end portion 17 of stem 18 is centrally recessed to accommodate an O-ring 37 which surrounds the piston 34 in sealing relation, this O-ring 37 being retained in place by the retainer disc 33. A primary compression spring 38 surrounds piston 34 within body 16 and abuts at one end against the main body of plunger piston 28 and at its other end against a suitable recess provided in O-ring retainer disc 33. This spring is of considerably less strength than the secondary spring 31.

In operation, the user will grasp the pipetter as illustrated in FIG. 1, with the body 16 held in the hand so that the plunger knob 27 can be operated by the thumb. As this knob is depressed against the tension of primary spring 38, a stop will be encountered, i.e., the engagement of calibrating collar 29 with the bottom of calibrating cup 30, the knob 27 then being in the dot-dash position shown in FIG. 4. This travel from the released position to the stop is the primary or calibrating movement and compresses primary spring 38 somewhat. Now, with additional pressure, the plunger knob may be depressed to its lowest position, i.e., when the under-surface of this knob directly engages the top of body 16 as illustrated in FIG. 5. This travel beyond the calibrating range is the secondary or over-shoot movement.

To pick up and deliver a precise quantity of liquid, the user will first remove the pipetter from its socket member 12 in instrument rack and tip loading tray 4. He will then guide the tapered portion 19 of stem 18 into the bore of a tip 10, pressing firmly down and vertically withdrawing. This will remove the tip 10 as friction will retain the tip on the pipetter. The knob 27 is now depressed to the first stop, i.e., performing the primary or calibrated movement, as evidenced by collar 29 striking the bottom of cup 30 before the tip is introduced into the sample solution. The tip is now introduced into the sample solution approximately one-eighth of an inch deep, and the plunger knob 27 is allowed to return smoothly to its initial position, whereupon the pipetter can be removed from the sample solution and the tip wiped, if desired, with a lint-free material without touching the tip opening. The tip is now introduced into a receiving vessel such as test-tube 39, placing the tip against the side-wall thereof. The plunger knob 27 is now smoothly depressed to the first stop, and, after a pause, depressed to the second and lowest position against the tension of secondary stiff spring 31, as illustrated in FIG. 5. With the knob held in the lowest position, the pipetter instrument is slowly withdrawn with the tip 10 sliding against the inner wall of the test-tube 39 to remove all traces of liquid, whereupon the pipetter is introduced into the notch 26 of tip extractor 5, as shown in FIG. 1, to remove the tip 10.

The movement of the knob 27 to the first stop causes the piston 34 to move from the solid line position shown in FIG. 4 to the dotted line position shown therein, and this is the length of movement that takes place during loading of the pipetter. The movement from the dotted line position to the bottom of space 35 represents the over-travel of the piston during the movement of the plunger 27 to the second or lowest position of the piston 34, thus causing reduced extension 36 of this piston to over-travel from its dotted position shown in FIG. 4 to its lowest dotted position shown in full lines in FIG. 5, with the lowest end of this reduced extension of the piston, substantially flush with the lower end of tapered portion 19. This over-travel of the piston, i.e., beyond the calibrated range, serves to eliminate substantially all traces of liquid in the tip 10. By varying the thickness of calibrating collar 29 and/or the size of cup 30 and diameter of piston extension 36, the capacity of the pipetter may be varied. If desired, the plunger piston 34 may be made of uniform diameter throughout its length as shown at 34' in FIG. 10. In this figure, the primary spring 38' is shown extending within the tubular body 18', and the O-ring is positioned adjacent the tapered portion 19'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pipetting system, a pipetter comprising a hollow cylindrical body having a substantially flat top portion and a frusto-conical apertured lower end portion, a hollow frusto-conical tip shaped for conformably and frictionally engaging said frusto-conical body lower end portion to retain said tip on said body portion, a piston movable within said body and projecting into said frusto-conical lower end portion, the upper end portion of said piston projecting upwardly through the top portion of said body, a knob attached to the upper end of said piston exteriorly of said body, a relatively weak primary compression spring surrounding said piston and interposed between a portion of the same and said body to urge said piston upwardly within said body, a calibrating cup within said body adjacent the top portion thereof, a calibrating collar fixed on said piston and normally abutting the inner surface of said body top portion and movable within said cup, and a secondary relatively stiff compression spring interposed between the bottom of said cup and said body, the depressing of said knob by overcoming the lower tension of said primary spring until said calibrating collar strokes the bottom of said calibrating cup constituting the calibrated movement of said piston, further depressing said knob against the increased tension of said relatively stiff secondary spring until said knob abuts the top portion of said body constituting the over-shoot travel of said piston.

2. In a pipetting system as defined in claim 1, an O-ring surrounding and sealing said piston within said cylindrical pipetter body, an O-ring retainer engaging said O-ring on one side and said primary spring on the other, and a retaining sleeve within said pipetter body and abutting said O-ring retainer at one end in surrounding and guiding relation to said primary spring and abutting said secondary spring at its other end.

3. In a pipetting system as defined in claim 1 wherein said pipetter removable tips are provided with rib projections having stop shoulders, an instrument rack and tip loading tray having a flat top provided with a plurality of mutually spaced depending receptacles for receiving said tips, said rib projections stop shoulders supporting said tips on the top of said rack and tip loading tray, said tray having a depending flange for fitting upon the top of a box, said rack and tip loading tray having depending socket members for supporting said pipetters thereon when not in use.

4. In a pipetting system as defined in claim 1 wherein said pipetter body is provided with a reduced lower stem portion terminating in said frusto-conical lower end portion for enabling said body to enter narrow vessels and is further formed with a projecting shoulder adjoining said frusto-conical lower end portion, said shoulder acting as a fulcrum point in removing tips from said body in use.

5. In a pipetting system as defined in claim 4, a tip extractor having a flat top provided with a peripheral depending flange for fitting upon a supporting box, said top having a transverse slot for receiving the frusto-conical lower end portion of said pipetter above a tip held thereon, the tilting of said pipetter when entered into the slot serving to cause said projecting shoulder in conjunction with said tip extractor to eject the tip from said pipetter and into the box without manually touching the tip.

*6. In a pipetting system which includes:*

*a hand-held pipetter with a hand-operable pump piston within a pump chamber, said pump chamber communicating with an opening at one end of said pipetter, said opening being surrounded by an end portion of the pipetter, and*

*a generally conically shaped hollow tip having different size openings at its opposite ends, the largest opening of said tip being of a size to frictionally engage said pipetter end portion in a manner to form a fluid-tight seal between an inside surface of said tip and on outside surface of the pipetter end portion, whereby liquid may be drawn into said tip and discharged therefrom through its smallest opening by operation of said pump piston when said tip is frictionally held at its largest end by said pipetter end portion,*

*the improvement comprising,*

*a plurality of ribs extending along an outside surface of said tip between its said opposite ends, said ribs terminating at one end thereof a distance from the smallest opening of said tip in blunt stop shoulders,*

*whereby a plurality of such tips may be removably stored in an upright position on a surface having a plurality of circular receptacles by resting the stop shoulders of said tips against said surface with the tip ends having the smallest openings being inserted into said circular receptacles, thus allowing a tip to be inserted onto said hand-held pipetter by forcing said end portion of the pipetter into a tip without contaminatio · of handling by hand.*

*7. A pipetting system, comprising:*

*a hand held pipetter having a body which forms an internal pump chamber,*

*a piston operably mounted in said chamber, said piston operable by hand through a connection therewith to a knob external of the pipetter body,*

*an end portion of said pipetter body having generally a circular cross-section and an aperture therein in liquid communication with said pump chamber,*

*a hollow tip having generally a conical shape with a largest end thereof shaped for frictional engagement with the circular outside surface of said pipetter body end portion for retention of said tip on the pipetter body, said tip being provided with a plurality of ribs on its outside surface which terminate in abrupt stop shoulders at the end of the ribs that are furthest removed from said large end, said stop shoulders being located a distance from a smallest end of said tip, and*

*an instrument rack and tip loading tray having a substantially flat top provided with a plurality of receptacles each for receiving the smallest end of a tip with its largest end protruding upward, said ribbed projection stop shoulders supporting each of said tips on said substantially flat top of said instrument rack and tip loading tray, whereby fresh tips may be successively inserted onto said end portion of the pipetter body by forcing said end portion through the pipetter body downward by hand against and into a tip.*

*8. A pipetting system according to claim 7 and additionally comprising mechanical means for engaging an outside surface of said hollow tip in a manner to allow disengagement of the hand-held pipetter from a tip, said means for engaging the outside surface of a tip being mounted on a container so that a frictionally disengaged tip will fall into said container after disengagement from the pipetter.*

*9. A pipetting system according to claim 7 wherein the substantially flat top of said instrument rack and tip loading tray includes a plurality of receptacles for receiving said outside surface of said pipetter body end portion in a manner to support said pipetter for storage thereof.*

*10. For use with a hand-held pipetter having a hand-operable pump piston within a pump chamber, said pump chamber communicating with an opening at one end of said pipetter, said opening being surrounded by an end portion of the pipetter, a pipetting system comprising:*

*a plurality of disposable tips, each of said tips having generally a conical shape with a largest end thereof shaped for frictional engagement with the end portion of said pipetter for retention of the tip on the pipetter body, each of said tips additionally being provided with an abutment projecting outward from its outside surface a distance between said largest end and an opposite smaller end of said tip, and*

*a tip loading tray having a substantially flat top and provided with a plurality of receptacles for receiving a plurality of tips, each receptacle receiving the smallest end of a single tip with the tip supported against gravity by contact between its abutment and a portion of the tray's flat top around its associated receptacle, each tip having its largest end protruding upward, whereby fresh tips may be successively inserted onto said end portion of the pipetter body by forcing said end portion through the pipetter body downward by hand against and into a tip.*

*11. For use with a liquid sampling device having a body forming an internal pump chamber, a piston operably mounted in said chamber, and an end portion having an outside surface of generally a circular cross-section with an internal aperture in fluid communication with said pump chamber, a detachable tip, comprising:*

*a hollow shell of generally a conical shape forming a passage therethrough with a large opening at one end and a small opening at an opposite end, said large opening having an inside surface shape adapted to cooperate with the outside surface shape of said liquid sampling device in a manner to permit frictional engagement therebetween, and*

*an abutment projecting outward from an outside surface of said shell for supporting in an upright posi-*

*tion the weight of said shell with said opposite end projecting downward through a circular opening of a tray.*

*12. For use with a liquid sampling device having a body forming an internal pump chamber, a piston operably mounted in said chamber, and an end portion having an outside surface of generally a circular cross-section with an internal aperture in fluid communication with said pump chamber, a detachable tip comprising:*

*a hollow shell of generally a conical shape forming a passage therethrough with a large opening at one end and a small opening at an opposite end, said large opening having an inside surface shape adapted to cooperate with the outside surface shape of said liquid sampling device in a manner to permit frictional engagement therebetween, and*

*means providing a supporting surface that is positioned said ends for holding said shell upright against the force of gravity.*

*13. A pipetting system for use with a liquid sampling device, comprising:*

*a tip holding surface having a plurality of openings therein, and*

*a plurality of disposable tips, each of said tips including a hollow shell of generally a conical shape forming a liquid receiving passage therethrough with a large opening at one end and a small opening at an opposite end, each of said tips additionally including means projecting outward from an outside surface of the hollow shell providing a supporting surface for contacting said tray about one of said openings therein to hold the tip upright against the force of gravity while said opposite end extends downward through said opening.*

*14. The pipetting system of claim 13 wherein said tray contact means of each tip includes a projection outward from its shell outside surface at a location intermediate of its said one and opposite ends.*

*15. The pipetting system of claim 13 wherein said tray contacting means includes a plurality of ribs extending along the shell outside surface in a direction of its length, each of said ribs terminating in a blunt stop shoulder at one end thereof a distance from said opposite end.*

*16. A detachable tip for use with a liquid sampling device having an end portion with an outside surface of generally a circular cross-section, said tip comprising:*

*a hollow shell of generally a conical shape forming a fluid passage therethrough with a large opening at one end and a small opening at an opposite end, said large opening having an inside surface shape adapted to cooperate with the outside surface shape of the end portion of said liquid sampling device in a manner that permits frictional engagement therebetween, and*

*a plurality of ribs extending along an outside surface of said shell between its said one and opposite ends, each of said ribs terminating at one end thereof a distance from the smallest opening of said shell in a blunt stop shoulder.*

*17. A tip for use with a liquid sampling device, comprising:*

*a hollow shell of generally a conical shape forming a fluid passage therethrough with a large opening at one end and a small opening at an opposite end, and*

*a plurality of ribs extending along an outside surface of said shell in a direction of its length, said ribs terminating in blunt stop shoulders at one end thereof a distance from the smallest opening of said tip in a manner to provide support of the shell against gravity when positioned upright.*

*18. A detachable tip for use with a liquid sampling device having an end portion with an outside surface of generally a circular cross-section, said tip comprising:*

*a hollow shell of generally a conical shape forming a passage therethrough with a large opening at one end and a small opening at an opposite end, said large opening having an inside surface shape adapted to cooperate with the outside surface shape of the end portion of said liquid sampling device in a manner that permits frictional engagement therebetween, and*

*means projecting outward from an outside surface of said shell for providing a surface intermediate of said one end and said opposite ends and capable of holding said shell upright against the force of gravity about a circular opening in a supporting surface.*

References Cited

The following references, cited by the Examiner, are of record in the patented file of this patent or the original patent.

UNITED STATES PATENTS

| | | | |
|---|---|---|---|
| 2,530,909 | 11/1950 | Riggs | 73—425.6 |
| 2,959,964 | 11/1960 | Streitfeld | 73—425.6 |
| 3,244,009 | 4/1966 | Tietje et al. | 73—425.6 |
| 3,302,462 | 2/1967 | Pursell | 73—425.4 |
| 3,343,539 | 9/1967 | Moorhouse | 222—340 |
| 3,506,164 | 4/1970 | Weichselbaum et al. | 73—425.6 |
| 3,379,315 | 4/1968 | Broadwin | 211—74 |
| 2,360,224 | 10/1944 | Hannaford | 211—74 |
| 2,489,035 | 11/1949 | Jones | 73—425.4 |

S. CLEMENT SWISHER, Primary Examiner

U.S. Cl. X.R.

23—292; 128—218

Disclaimer

Re. 27,637.—*William J. Roach*, Foster City, Calif. PIPETTING SYSTEM. Patent dated May 8, 1973. Disclaimer filed Sept. 11, 1975, by the assignee, *Oxford Laboratories, Inc.*

Hereby enters this disclaimer to claims 11, 12 and 16–18 of said patent.

[*Official Gazette November 11, 1975.*]